United States Patent [19]
Lowell

[11] Patent Number: 5,341,476
[45] Date of Patent: Aug. 23, 1994

US005341476A

[54] DYNAMIC DATA DISTRIBUTION NETWORK WITH SINK AND SOURCE FILES FOR PARTICULAR DATA TYPES

[75] Inventor: Augustus P. Lowell, Sunnyvale, Calif.

[73] Assignee: Abbott Laboratories, Abbott Park, Ill.

[21] Appl. No.: 995,757

[22] Filed: Dec. 23, 1992

[51] Int. Cl.⁵ .................... G06F 13/00; G06F 15/40
[52] U.S. Cl. .................... 395/200; 395/250; 395/600; 395/650; 364/DIG. 1; 364/280.6; 364/284.1; 364/284.3
[58] Field of Search ............. 395/200, 250, 500, 600, 395/650

[56] References Cited

U.S. PATENT DOCUMENTS

| | | | |
|---|---|---|---|
| 5,056,003 | 10/1991 | Hammer et al. | 395/650 |
| 5,058,162 | 10/1991 | Santon et al. | 380/25 |
| 5,249,268 | 9/1993 | Doucet | 395/200 |

OTHER PUBLICATIONS

Withers, "OS/2 Interprocess Communication Features," *The C Users Journal*, vol. 8, No. 11, Nov. 1990, p. 35.

Freda, "UNIX Interprocess Communications," *The C Users Journal*, vol. 8, No. 11, Nov. 1990, p. 49.

Gilson, "Interprocess Communication: A VAX/VMS Examples," *The C Users Journal*, vol. 8, No. 11, Nov. 1990, p. 70.

Husain, "Real-Time," *Embedded Systems Programming*, vol. 4, No. 4, Apr. 1991, p. 36.

Mafla et al, "Communication Facilities for Distributed Transaction-Processing Systems," *Computer*, vol. 24, No. 8, Aug. 1991, p. 61.

*Primary Examiner*—Paul V. Kulik
*Assistant Examiner*—John C. Loomis
*Attorney, Agent, or Firm*—Christensen, O'Connor, Johnson & Kindness

[57] ABSTRACT

A dynamic data distribution network (12) for use with a software package (10), which includes modules (14, 16, and 18) that produce data and modules (20, 22, 24, and 26) that consume data. The network includes source files (30) and sink files (32). Each data-consuming module contains one or more sink files, each of which serves as a buffer for one type of data used by the module. Each source file serves as a buffer for one type of data that is generated by a data-producing module. Each source file also contains a sink link table (40) that identifies the individual sink files, which serve as buffers for the data consumers that use that data. Whenever new data is generated, a data distribution task (34) initially stores the data in the associated source file and, then based on the contents of the sink link table, copies the data into the appropriate sink files associated with the data consumers that use the data. The data distribution function also informs the data consumers that new data are available in the sink file with which the data consumer is associated, enabling the data consumers to retrieve the data from the sink files.

21 Claims, 7 Drawing Sheets

DYNAMIC DATA DISTRIBUTION NETWORK WITH SINK AND SOURCE FILES FOR PARTICULAR DATA TYPES

FIELD OF THE INVENTION

This invention relates generally to digital data processing systems and, more specifically, to a network capable of distributing data to different modules running on a digital data processing system.

BACKGROUND OF THE INVENTION

A digital data processing system has three basic components, a processor, a memory, and a set of input-output devices. The processor manipulates data based on a set of programmed instructions. The memory functions as a storage area for both the data and the processor instructions. The input-output devices serve as ports through which data is introduced into the system and through which the results of the data processing are presented. Digital data processing systems comprising general purpose computers are designed to manipulate and process different types of data based on the instructions with which they are supplied. Other digital data processing systems are custom built to process specific data in order to determine specific results. One such customized system is the data processing that is built into a cardiac monitor. This system monitors certain physiological parameters, such as the blood pressure and blood temperature of a patient and, based on these parameters, determines how well the patient's heart is functioning.

The instructions and data for many digital data processing systems are contained in software blocks called modules. Typically, a module is designed so that, when it is run on a digital data processing system, it will perform one or more of the intermediate tasks the system needs to perform to determine the desired result. An advantage of designing software in module form is that the individual modules can be developed and modified independently. This makes it easier to optimize each module as well as making it easier to maintain the software. Moreover, a software module developed to accomplish a given set of tasks becomes a building block for use in any digital data processing systems that need to perform those tasks as part of their overall operation. Access to a library of modules reduces the costs associated with having to write new software each time it is necessary to instruct digital data processing systems to perform the tasks for which modules have already been developed. For example, a software module designed to read a blood pressure gauge can be incorporated in different data processing systems that read such a gauge in order to accomplish the task for which they are designed.

The development of modularized software is often limited by the need to provide a data link between the individual modules. A software module, for example, that calculates heart rate needs to receive an indication of the patient's fluctuations in blood pressure. These data are produced by the software module that monitors the pressure of the blood pressure gauge. To date, a number of mechanisms have been developed to facilitate the transmission of data from software modules that generate data, called data producers, to software modules that need the data to function, called data consumers. Each of these mechanisms has design requirements that can limit its utility. One such mechanism is implemented as a direct dispatch process. In this process, a data producer sends messages containing the data to each data consumer module that requires the data. Whenever multiple data consumers require the same data, the data producer must create and transmit identical messages containing the data to the individual consumers. Each time a data-producing module is installed in a new software package, it must be provided with a set of instructions that contain the directions that indicate to which data-consuming modules it should send the data. The requirement of having to add a new set of instructions to each data-producing module each time there is need to supply the data it produces to a new data-consuming module detracts from the universality of the module. Furthermore, as the number of modules in a software package increases, the task of keeping track of which modules supply what data to other modules, in order to efficiently design the instructions integral with each module, becomes increasing difficult.

Still another data transfer process currently in use requires the data-consuming modules to retrieve the data from the data-producing modules. Each data-consuming module must be provided with instructions that direct it to query each data-producing module from which it receives data in order to obtain the desired data. Moreover, each data-producing module must be provided with an appropriate set of instructions that set a flag to indicate that it has a specific type of data available for a complementary data-consuming module. Since each data-producing module must typically set a separate data-available flag for each data-consuming module for which it has data, as the number of modules that require data rises, the complexity and length of the necessary flag-setting instructions similarly increase.

Sometimes data processing systems are provided with shared memories. In such a system, the data producer writes the data into a selected memory location. The data consumers that require that data are provided with instructions directing them to retrieve the data from that memory location. While this mechanism has some advantages, it is not without limitations. The data-consuming modules typically need to be informed that new data are available so that they execute the process steps necessary to retrieve the data. If there are numerous data-consuming modules for the same data, the resultant system can then have the same complexity as those found in direct dispatch systems. Also, in many data processing systems, only one data-consuming module can read the data in shared memory locations at any given instant. Sometimes a data-producing module will overwrite new data into the memory between the times when the memory is accessed by different consumers. The various data consumers will then perform their processing on different data, which can lead to obviously undesirable results. Attempts have been made to solve this problem by providing the shared memories with first-in/first-out buffers that store different versions of the data, or with multiple memory slots in which multiple copies of the same data are stored. A disadvantage of these mechanisms is that they can be as cumbersome to control as regular point-to-point data transfer schemes. Moreover, since the individual data-consuming modules are often unable to access the same data at the same time, it is difficult to configure the system so that each module processes the same data at the same time.

Furthermore, in many data processing systems, the individual modules are sometimes scheduled to operate only when they receive new data to process. Typically, a module is triggered to operate only when a selected type of new data is received. As a result, the module will not operate even when data other than the selected data are available for it to process. For example, a heart rate program may remain quiescent while it awaits new blood pressure data, even though there are new blood temperature data available that it could process. The failure of the module to operate in this situation, like the difficulties associated with inter-module data transfer, detracts from the efficiency of providing data processing systems with software packages constructed from a collection of modules.

SUMMARY OF THE INVENTION

This invention relates to a new mechanism for passing data between the modules running on a digital data processing system. More particularly, this invention relates to a dynamic data distribution network that both facilitates data transfer and provides a mechanism for informing data-consuming modules whenever new data are available for processing.

The dynamic data distribution network of this invention includes a set of source files that are associated with the data-producing modules and a set of sink files that are associated with the data-consuming modules. Each source file contains data that describe the sink files to which a particular type of data generated by a data producer should be sent. Each sink file serves as a temporary buffer for a particular type of data required by a particular one of the data consumers. Whenever a data producer has data to forward to the data consumers, a data distribution function writes the data into the appropriate sink files based on the instructions contained in the source file for that data.

The dynamic distribution data network further includes a read data function which operates on the sink files. Each data-consuming module also has an associated input queue. When the data distribution function places data in a sink file, its also places a notice in the input queue for the data consumer associated with that sink file to inform it that there are new data in the sink file. When one of the data consumers activates the read data function, the read data function reads the input queue to determine if the input queue contains any new data notices. If there is such a notice in the queue, based on information in the activation command, the read data function accesses the appropriate sink file to retrieve the new data and copy it to the data consumer. Then, depending on the instructions that form that data-consuming module, the module takes appropriate action to process the newly retrieved data. If there are no pointers in the queue, the read data function waits for a pointer to arrive before continuing to execute.

The dynamic data distribution network of this invention provides a convenient means to forward data to the individual data-consuming modules that require it. The data-producing module has to forward only one copy of the data. This singular transaction eliminates the need to revise the instructions contained in the data-producing module each time there is a need to provide a new consuming module with a copy of the data. Similarly, there is no need to provide the data-consuming modules with specific instructions that inform them of the identities of the modules from which they can retrieve required data. The elimination of the need to have to provide the data-producing and data-consuming modules with customized data exchange instructions each time they are placed in a new software package makes the modules more generally applicable for use in a variety of software packages.

Furthermore, the read data function and input queues of this invention provide the data-consuming module with a convenient mechanism for receiving notices that new data are available for processing. This procedure prevents processing backups that can occur if a data-consuming module waits to receive one type of data, even though an updated version of another type of data is available for processing,

BRIEF DESCRIPTION OF THE DRAWINGS

This invention is defined with particularity in the appended claims. The advantages of this invention may be better understood by referring to the following detailed description, in which:

DETAILED DESCRIPTION OF THE INVENTION

Figure 1:
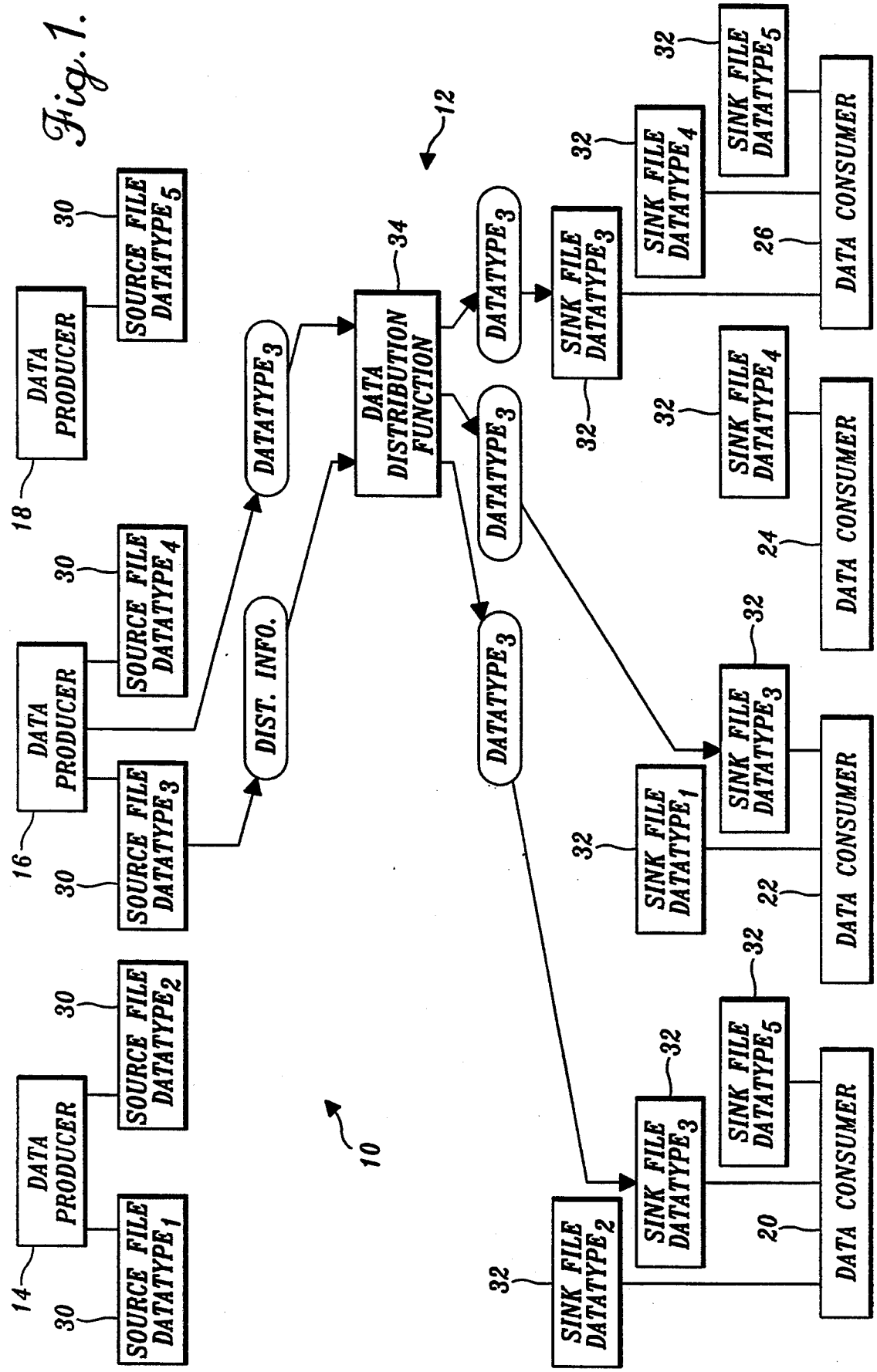
FIG. 1 is a block diagram of a multi-module software package that includes a data distribution network constructed in accordance with this invention.

FIG. 1 illustrates a software package 10 that is run on a digital data processing system, which comprises a number of different modules, and that includes a dynamic data distribution network 12 in accordance with this invention, to transfer data between the modules. Specifically, software package 10 includes a set of data producer modules 14, 16, and 18 that generate data used by other modules in the package. The other modules, data consumer modules 20, 22, 24, and 26, use the data generated by the data producer modules 14, 16, and 18. Some data producer modules generate more than one type of data that are used by other modules. In the illustrated software package 10, data producers 14 and 16 each generate two different types of data; data producer 18 generates only a single type of data. Collectively, the data producers 14, 16, and 18 produce five different types of data, sequentially identified as DataType$_1$, DataType$_2$, ... DataType$_5$. The data consumer modules 20, 22, 24, and 26 use the different types of data to accomplish the task for which they are designed. In the illustrated software package, data consumers 20 and 26 each require three different types of data; data consumer 22 requires two different types of data; and data consumer 24 requires only a single type of data. It should also be understood that any given module 14–26 is typically not an exclusive data producer or data consumer. Each module usually consumes data generated by another module, processes that data to obtain a desired result, and makes the processing result available as data for another module. For example, data producer 18 and data consumer 22 may be a single module, this module is designed so that based on two types of input data, it produces a single type of output data.

Dynamic data distribution network 12 includes a set of source files 30 and a set of sink files 32. Each source file 30 is associated with a particular type of data produced by one of the data producers 14, 16, and 18. Data producer 16, which, for example, produces two types of data, DataType$_3$ and DataType$_4$, has two source files 30 associated with it. Each source file 30 includes a buffer 38 (FIG. 3) for temporarily storing the data and a list of sink files 32 to which the data should be written. Each sink file 32 serves as a temporary buffer for one type of data that is used by one of the data consumers 20, 22, 24, or 26. Data consumer 20 uses three types of data received from other modules, DataType$_2$, DataType$_3$, and DataType$_5$; it has three sink files 32 associated with it.

Figure 2:
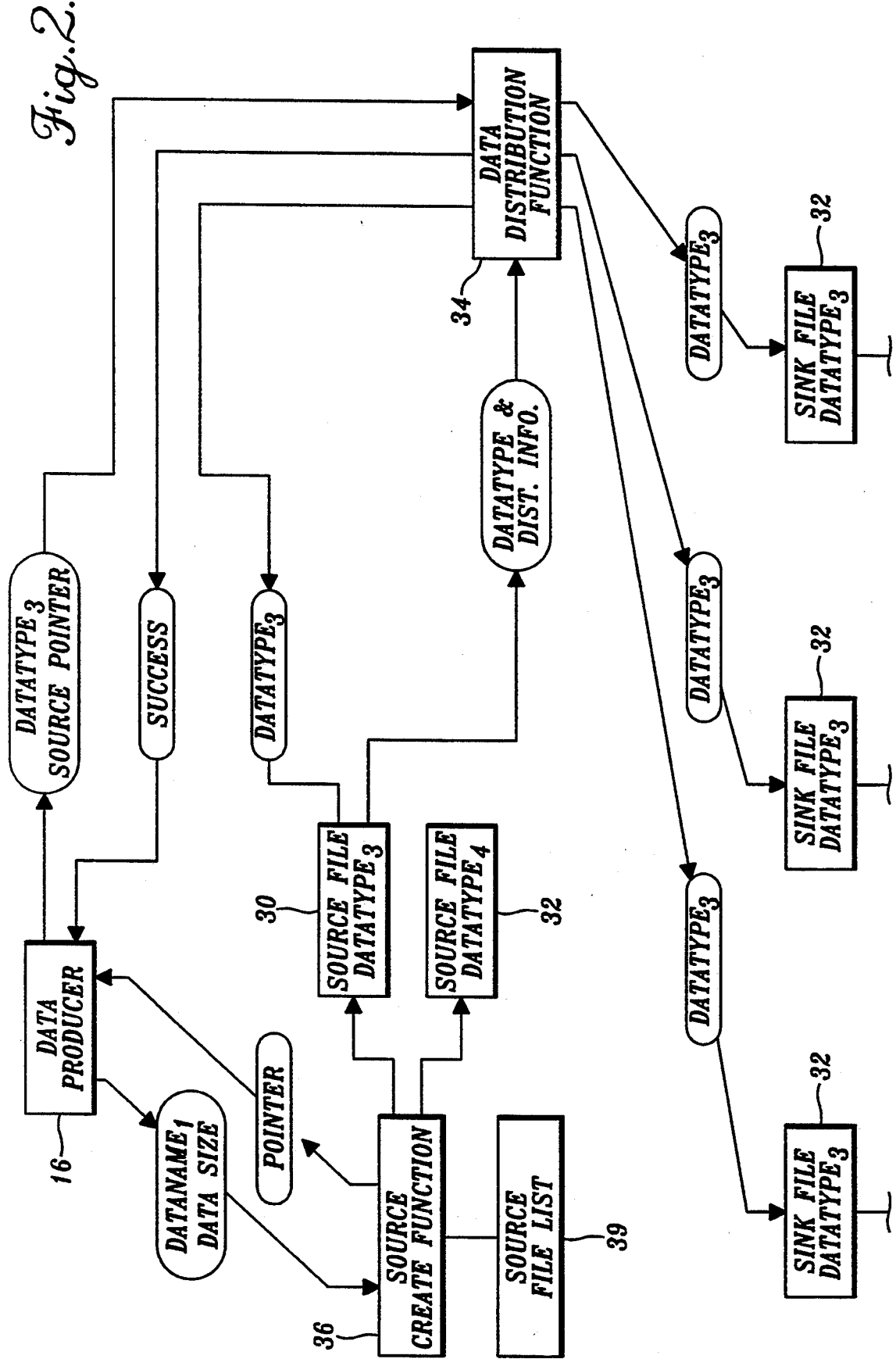
FIG. 2 is a detailed block diagram of the dynamic data distribution network of this invention, illustrating how source files are created, how data are placed in the source files, and how data are transferred from the source files to the sink files.

A data distribution function 34 controls the transfer of data from the data producers 14, 16, and 18 to the sink files 32 associated with the data consumers 20, 22, 24, and 26 that require the data. Each time new data are generated, the originating data producer 14, 16, or 18 sends an instruction directing the execution of the data distribution function 34 along with the location of the data and the identity of the associated source file 30. Based on the distribution information in the source file 30, the data distribution function 34 writes the data into the appropriate sink files 32. For example, as depicted in FIG. 2, when data producer 16 generates a new version of DataType$_3$, based on the distribution information contained in the source file for DataType$_3$, the data distribution function writes the data into the three sink files 32 associated with the individual data consumers 20, 22, and 26 that use DataType$_3$. Once new data are written into a sink file 32, a notification that the file was updated is sent to the associated data consumer 20, 22, 24, or 26. This notification serves as a cue to the receiving data consumer 20, 22, 24, or 26 that there are new data available for retrieval in one of the sink files with which the data consumer is associated. The data consumer 20, 22, 24, or 26 then retrieves the data for processing.

Figure 3:
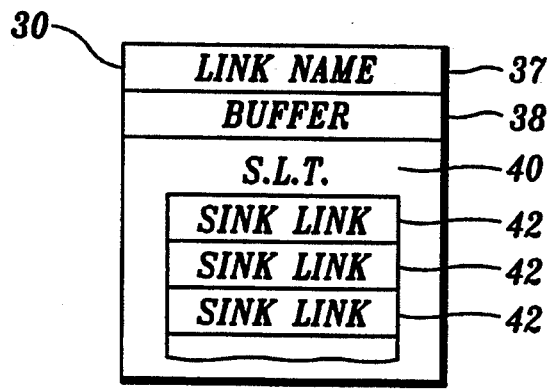
FIG. 3 is a block diagram of a source file.

FIG. 2 illustrates the relationship between a data producer, in particular, data producer 16, and the dynamic data distribution network 12 of this invention. Dynamic data distribution network 12 includes a source create function 36 that is employed by the data producers 14, 16, and 18 to generate source files 30. When, upon initialization or another programmed triggering event, a data producer 14, 16, or 18 becomes aware that it has or will generate data that one or more data consumers 20, 22, 24, or 26 will require, the data producer accesses the source create function 36 to establish a source file 30 for that data. The data producer 14, 16, or 18 generates a command to the source create function 36 directing the function to establish a source file 30 for the data. Integral with the command are two arguments, the link name assigned to the data in the particular software package 10 in which data producer 16 is installed and the size of the data in bytes. The source create function 36 then creates a source file 30 for the data. As depicted in FIG. 3, the source file 30 is a location in the memory of the digital data processing system that includes a link name field 37 that contains the name assigned to the data in the software package, a data buffer 38 in which the data are stored, and a sink link table (S.L.T.) 40. The S.L.T. 40 contains a set of sink link records (S.L.R.s)42. Each S.L.R. 42 comprises a pointer or some other record that indicates a specific sink file 32 to which the data should be forwarded. Once the source create function 36 opens a source file 30, the function enters the identity of the file on a source file list 39. The entry for each source file 30 on the list 39 includes the link name for the data transferred through the file and a pointer that identifies the location of the file. The source create function 36 also returns a pointer that identifies the file to the data producer 14, 16, or 18 that opened the file.

Figure 4:
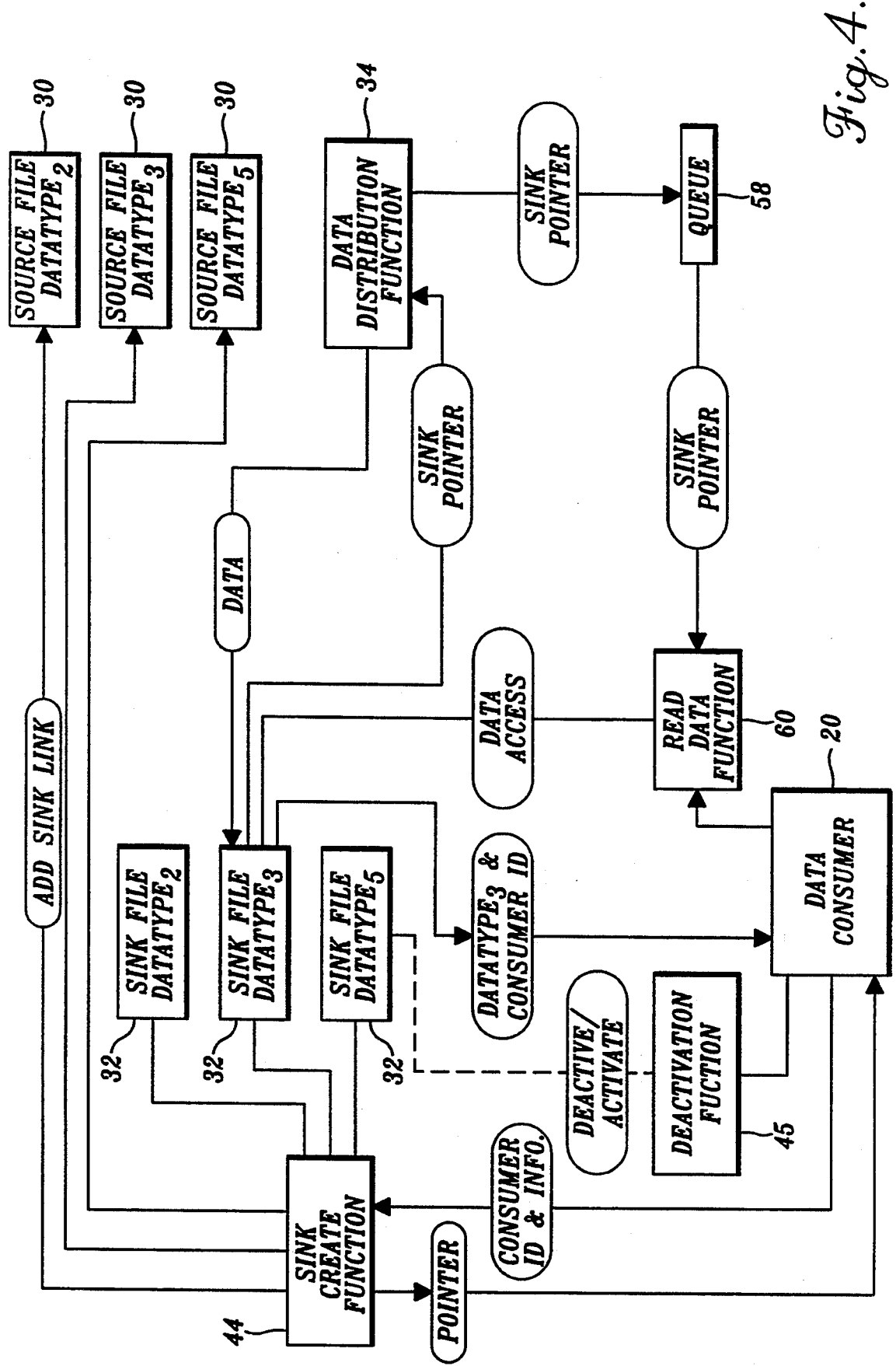
FIG. 4 is a detailed block diagram of the dynamic data distribution network of this invention, depicting how sink files are created and how the data are transferred from a sink file to the associated data consumer.

The relationship between the data consumers 20, 22, 24, and 26 and the dynamic data distribution network 12 is depicted by FIG. 4. More particularly, FIG. 4 depicts the relationship between the data distribution network and data consumer 20. The network 12 includes a sink create function 44 that establishes the sinks 32 in which data are buffered before they are retrieved by the data consumers 20, 22, 24, and 26. When a data consumer 20, 22, 24, or 26 becomes aware that it needs data that are provided by another module, the consumer sends an open sink command to the sink create function 44. Integral with this command are arguments that include the link data name of the data, the size of the data to be stored; the consumer name of the data, which is the name that identifies the data in the instructions that form the data consumer 20, 22, 24, or 26; a pointer that identifies the queue 58 for the data consumer; the size of the buffer; and the type of the buffer. The sink create function 44 initially reviews the source file list 39 to determine if a source file 30 has been opened for the requested data (FIG. 2). If a source file 30 has not been created for the data requested by the data consumer 20, 22, 24, or 26, the sink create function 44 will direct the source create function 36 to open a source file 30.

Figure 5:
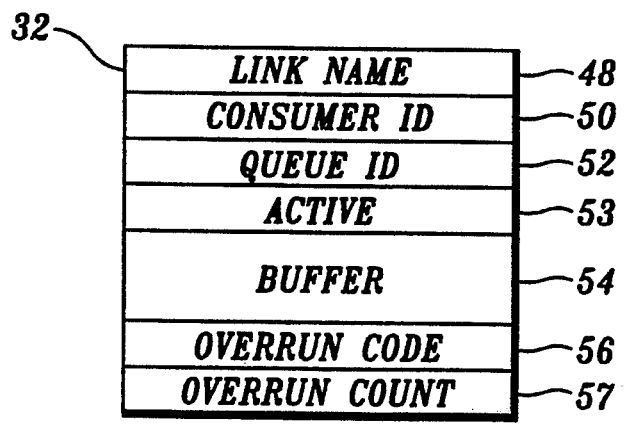
FIG. 5 depicts the format of a sink file.

The sink create function 44 then creates a sink file 32, depicted in detail in FIG. 5. Specifically, the sink file 32 contains a link name field 48 that identifies the data by the name assigned to it in the software package. This is the same name contained in the link name field 37 of the source file 30 (FIG. 3). A consumer identification field 50 contains the name that identifies the data in the instructions that form the data consumer 20, 22, 24, or 26. A queue pointer field 52 identifies the location to which the notice of the new data should be sent. As will be described hereinafter, this information is used by the data distribution function 34 to inform the data consumer 20, 22, 24, or 26 that it has new data available in one of its sink files 32.

The sink file includes a buffer 54 in which one or more versions of the data are stored. The size of the buffer 54 is defined by the argument sent by the data consumer 20, There is also an overrun code field 56.

The overrun code field 56 contains an indication of how the data distribution function 34 should overwrite data in the buffer 54 in the event there are already data in the buffer. Specifically, one type of buffering that can occur is STATIC-type buffering. In this type of storage, only the most current data are stored in the buffer 54. The data consumer 20, 22, 24, or 26 leaves the data in the buffer 54 after it reads the data. An alternative form of buffering is EVENT-type buffering. In EVENT-type buffering, the buffer 54 is actually zero-sized, or nonexistent. Data are not stored in the sink file 32 or forwarded to the associated data consumer 20, 22, 24, or 26. Instead, a notification that an event has occurred, i.e., that data was generated, is sent to the data consumer. Two other types of buffering, REJECT-type buffering and OVERWRITE-type buffering may be employed if the buffer 54 is able to store more than one version of the data. In both types of buffering the oldest data are read first by the data consumer 20, 22, 24, or 26 and are removed, as part of the reading process. In REJECT-type buffering, in the event of a buffer overrun, the newest available data is discarded. In OVERWRITE-type buffering, in the event of a buffer overflow, the oldest data in the buffer 54 are replaced with the newest data. Each data consumer 20, 22, 24, and 26 supplies an argument that indicates which type of overwrite buffering it wants performed for a particular type of data when it generates an open sink command. A sink file 32 with a REJECT- or OVERWRITE-type buffer 54 also includes an overrun count field 57. The overrun count field 57 is used to maintain a count of the number of times the associated buffer was overrun since the last time the sink file 32 was read.

The sink file 32 also contains an active field 53. The active field 53 contains a flag that indicates that the sink file 32 is active, i.e., the data distribution function 34 can place data in the sink file, or it has been deactivated, i.e., that the sink file is temporarily not available to receive new data. When a sink file 32 is initially created, the active field 53 is provided with a flag to indicate that the file is active and will accept data.

In addition to creating the sink file 32, the sink create function 44 also creates a sink link record 42 (FIG. 3) for the sink file in the sink link table 40 for the associated source file 30. The record typically contains a pointer to the sink file 32. Once the sink file 32 has been opened, the sink create function 44 returns a pointer identifying the sink file to the data consumer 20, 22, 24, or 26 that opened the file.

As depicted by FIG. 4, an input queue 58 (one shown), is associated with each data consumer 20, 22, 24, or 26. The queues 58 function as buffers to which notices regarding the placement of data in the sink files 32 associated with the data consumer are sent. More specifically, each queue 58 is provided with pointers that identify the specific sink files 32, which contain new data available for processing by the associated data consumer 20, 22, 24, or 26. A read data function 60, that is part of the data distribution network 12, responds to commands generated by a data consumer 20, 22, 24, or 26 to read the queue 58 associated with the data consumer. If there is a pointer in the queue, the read data function 60 accesses the identified sink file 32 and retrieves the data along with the consumer name for the data. The read data function 34 copies the data and the consumer name for the data to the data consumer 20, 22, 24, or 26. Depending on the particular structure of the data consumer 20, 22, 24, or 26, the data consumer then takes the appropriate action to process the data.

A deactivation function 45, also integral with the data distribution network 12, deactivates and reactivates individual sink files 32 to which data may be sent. During the running of the software package 10 by the digital data processing system, a particular data consumer 20, 22, 24, or 26 may send a command to the deactivation function 45 to temporarily deactivate a sink file 32. Such message may be sent if the data consumer 20, 22, 24, or 26 enters a particular period of operation in which it will not need updated versions of a particular type of data, or if there has been a significant overflow of data in the sink file buffer 54 that the data consumer recognizes must be processed. In response to such a command, the deactivation function 45 will set an appropriate flag in the sink file active field 53 to deactivate the sink file 32 (FIG. 5). When the data consumer 20, 22, 24, or 26 is again ready to accept a particular type of data, the data consumer will send an activate sink command back to the sink create function 44. The deactivation function 45 will, in turn, reset the flag in the sink file active field 53. The activate sink and deactivate sink commands include arguments, typically in the form of pointers, that identify the particular sink file 32 to be deactivated or reactivated.

Figure 6:
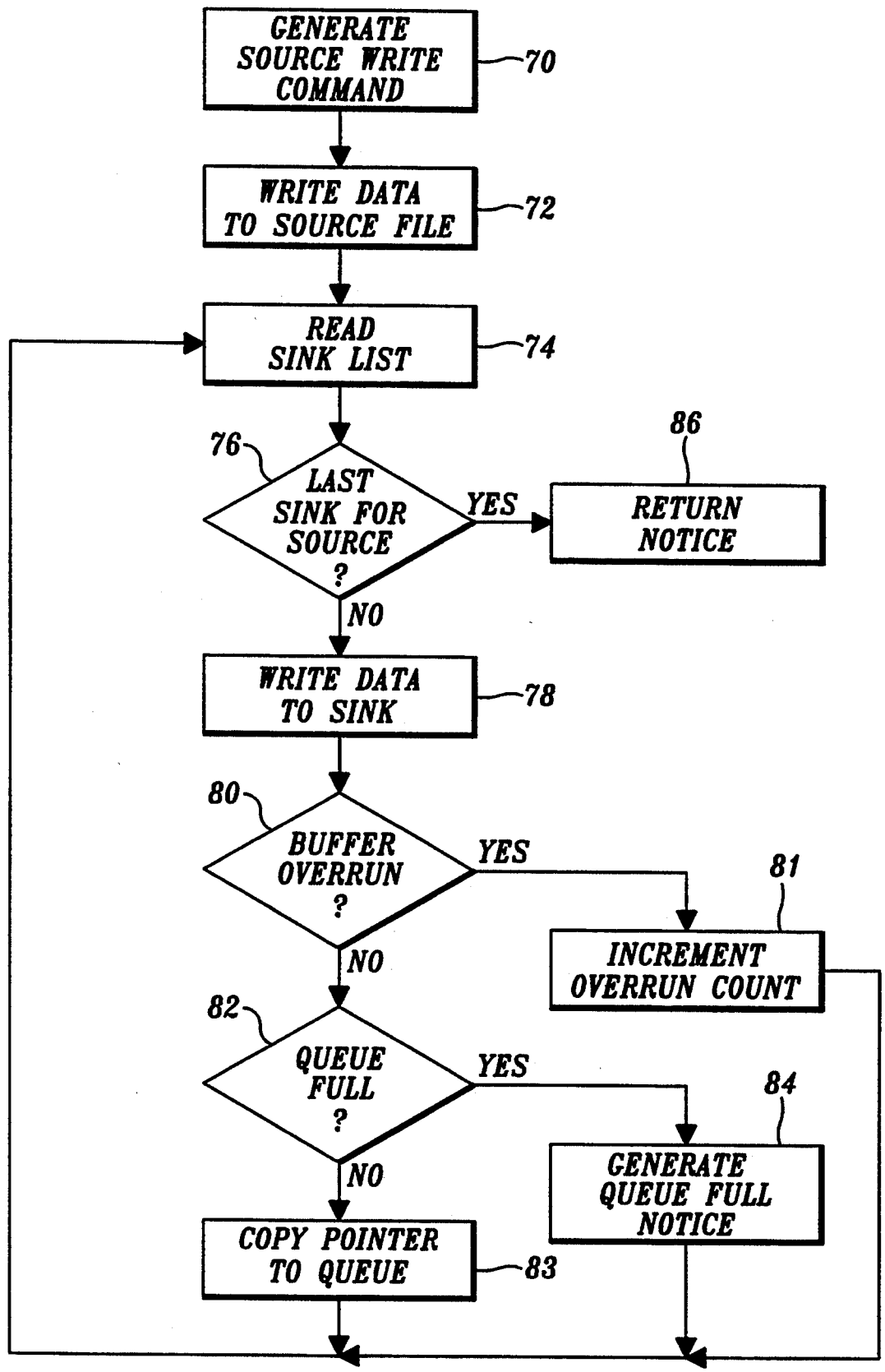
FIG. 6 is a flow chart or process diagram of the steps performed by the dynamic data distribution network of this invention to forward data from a data consumer to the sink files designated to receive that data.

FIG. 6 depicts the process by which a data producer 14, 16, or 18 (FIG. 1) transmits data that are forwarded to the sink files 32 of the various data consumers 20, 22, 24, or 26 that use the data. The process starts with the generation of a source write command represented by a step 70. In step 70, a write command is sent from the data producer 14, 16, or 18 that has created data, along with a pointer that identifies the location of the data and a pointer that identifies the location of the associated source file 30. The data distribution function 34 responds to the source write command by initially writing the data to the buffer 38 in the source file 30 (FIG. 3), as depicted by step 72. Data distribution function 34 then reads the sink list table 40, as depicted by step 74. More particularly, in the read sink list of step 74, the next sink link record 42 in the sink list table 40 is read. As part of this process, data distribution function 34 determines if it had already read the last sink link record 42, as depicted by step 76.

If there are additional sink link records 42 in the sink link table 40, the data distribution function copies the data from the source file buffer 38 into the sink file buffer 54 for the next sink file 32 (FIG. 5), as represented by step 78. More particularly, in write data step 78, if the overrun code 56 for the sink file 32 indicates that it is a STATIC-type buffer, the new data are simply written into the buffer 54. If the buffer 54 is an EVENT-type buffer, no data are read into the buffer. If the buffer is of the REJECT- or OVERWRITE-type buffer 54, data are written into the available space in the buffer or, if there is no available space, the data are written over either the newest data or the oldest data, depending on the type of the buffer. The data distribution function 34 also determines, if the buffer 54 is of a REJECT- or OVERWRITE-type, whether there was an overwriting of data already in the buffer. If the data in the buffer 54 was overwritten, an increment overwrite count step 81 is performed, wherein the total count and the overwrite count field 57 for the sink file 32 are incremented by one. The data distribution function 34 then reexecutes the read sink list 74. Alternatively, if the buffer 54 is a STATIC- or EVENT-type buffer 54, or data was not otherwise overwritten in the buffer 54, data distribution function 34 sends a sink pointer to the queue of the data consumer 20, 22, 24, or 26 associated with the sink file 32 (FIG. 4). More specifically, in queue-full evaluation step 82, the data distribution function 34 determines if the designated queue 58 has free capacity to accept an additional pointer. If the designated queue 58 has space available to accept a new pointer, the data distribution function copies the pointer to the queue as represented by step 83. If the designated queue 58 does not have any space available for accepting pointers, data distribution function 34 generates a queue-full fault notice as represented by step 84.

After the pointer is copied to the queue 58 or a fault notice is generated, data distribution function 34 rereads the sink list, reexecutes step 74, and determines if there are any other sink files in which the data should be stored. If the data distribution function 34 determines that it has copied data into the last sink file 32 identified in the sink link table 40, a return notice step 86 is performed. In the return notice step 86, a success message is sent to the data producer 14, 16, or 18 that produced the data to serve as indication that the data have been forwarded to all the consumers. This notice is of use to data producers that are designed to repeatedly generate data for use by consumers until they receive some indication that it was successfully received. The notice will also contain any fault notices that indicate the data distribution function 34 was unable to copy a pointer into the queue 58 of a specific data consumer. Some software packages 10 are constructed so that the receipt of this type of notice will serve as an indication that a major error has occurred and will cause the generation of an appropriate error message and/or will cause the software package to stop executing.

Figure 7:
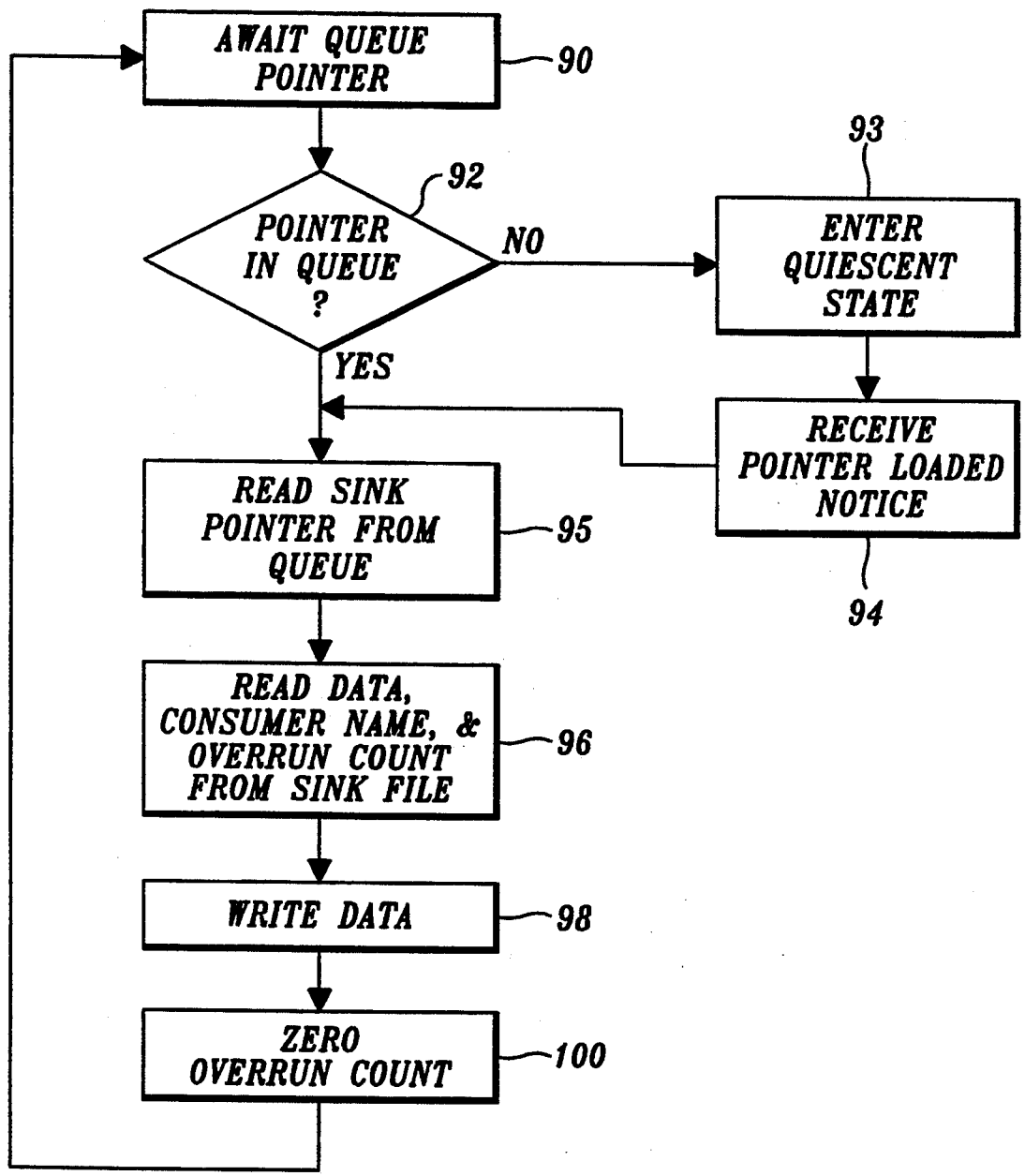
FIG. 7 is a flow chart or process diagram depicting how a data consumer retrieves the data that are stored in an associated sink file of the dynamic data distribution network of this invention.

The process by which the data consumer 20, 22, 24, or 26 retrieves data from a sink file 32 is now described with respect to the flow chart of FIG. 7. Periodically during the execution of instructions that comprise a data consumer 20, 22, 24, or 26, the data consumer generates a read data command to the read data function 60 (FIG. 4) to cause the function to read the queue 58 associated with the data consumer. The arguments associated with this command include a pointer that identifies the location to which the read data function 58 should copy the data, a pointer that identifies the queue 58 associated with the data consumer 20, 22, 24, or 26 that generated the command, and a pointer that identifies the location to which the data read function should copy the overrun count.

The execution of the read data function 60 starts with an await-queue-pointers step 90. In step 90, the read data function 60 reads the queue 58 for the data consumer 20, 22, 24, or 26. As part of this process the read data function determines if there are any pointers in the queue 58 as represented by step 92. If there are no pointers in the queue 58, the read data function 69 enters a quiescent state as represented by step 93. In a digital data distribution network installed on a digital data processing system that employs a multi-tasking operating system, the read data function 60 will remain quiescent until it receives a notice from another part of the system that a pointer has been loaded into the queue 58 it is monitoring. Once this notice is received, as represented by step 94, the read data function will proceed to read the pointer in the queue as described below. One such operating system on which this function can execute according to the above-described steps is the VRTX Operating System available from Ready Systems, Inc. of Sunnyvale, Calif.

If there is a pointer in the queue when the read data function 60 is initially executed or once the function receives a notice that a pointer has been loaded into the queue, the function proceeds to read the pointer as represented by a step 95. The read data function 60 then reads the sink file 32 identified by the pointer as represented by step 96. More specifically, in step 96 the read data function reads the data, the consumer identification, and overrun number from the queue from the designated sink file 32 Read data function 60 then executes a write data step 98 wherein it copies the data and overrun count from the sink file 32 into the designated locations specified in the read data command. Also, as part of the write data step 98, the function call returns the consumer name for the data in the sink file 32 to the data consumer 20, 22, 24, or 26 that generated the read data command. As part of the data-read process the read data function also zeroes the sink file overrun count field 57 (FIG. 5), as represented by step 100. The read data function 60 is then available to reexecute step 90 so that the queue 58 is reread.

The dynamic data distribution network 12 of this invention takes the single copy of data that is produced by a data producer, creates multiple copies of the data, and makes the individual copies of the data available to the data consumers that require the data. This procedure eliminates the need to provide a point-to-point communication network so that data producers can forward an individual copy of data to all the consumers that require it, or enable various data consumers to poll the producers in order to obtain copies of the data. Another feature of this dynamic data distribution network 12 is that it automatically provides a notice to the individual data consumers each time new data are available for their use. This feature eliminates the need to design the data consumers so that they periodically poll the data producers in order to determine if new data are available. Moreover, each data consumer receives a notice as soon as new data are supplied by this network 12, regardless of the nature of the new data. This notice reduces the likelihood a data consumer will delay the processing of data because it is waiting for one type of data even though it has a second type of new data available for processing.

Still another feature of the data distribution network 12 is that the data are transferred from the data producers to the data consumers by a mechanism that is wholly independent of the actual data consumers and producers. All that is necessary when designing a software package 10 that includes the dynamic data distribution network 12 is to define a set of link names for the data that are transferred between the various modules. Only minor modifications need to be made to the instructions contained within each module. Specifically, the data-producing modules 14, 16, and 18 need only be provided with the link names under which the data they generate are identified. The data-consuming modules 20, 22, 24, and 26 need only be provided with the link names under which the data they require are identified in the software package. Since each time data are provided to the data consumer, the data consumer is also provided with its internal consumer identification for the data, and the module can appropriately process the data based on its own name for the data. Thus, there is no need to rewrite the data consumer modules each time they are installed in a new software package so that each reference to data is by its link name as opposed to its consumer identification. Furthermore, by providing different types of sink file buffers 54 for storing the data, the data needs of the individual data consumers can readily be accommodated. A data consumer that requires a record of all of the data may, for example, be provided with a REJECT- or OVERWRITE-type buffer wherein not only the most recent data, but some of the historic versions of the data, are stored. A data consumer that requires only the most current data can be provided with a STATIC-type buffer. A consumer that needs to know only that an event occurred does not require a buffer; instead, it can use an EVENT-type action. The tailoring of the network to the requirements of each consumer minimizes the amount of memory space occupied by the sink file associated with that consumer. The ability to temporarily deactivate individual data sinks 32 minimizes the inefficient use of processor time that would otherwise occur due to copying data for a data consumer that may have no use for it. Furthermore, the ability to temporarily deactivate a sink file 32 eliminates the need to have to close a sink file each time a data consumer has a temporary period in which it does not need the data.

Dynamic data distribution network 12 is also especially useful for providing a communications network through which the modules can cause the execution of the other modules. A first module 20, 22, 24, or 26 can set up a sink file 32 with an EVENT-type buffer 54 that receives an indication when a second module has completed a specific activity. The second module 14, 16, or 18 then generates a particular data message whenever it requires the execution of the first module. When the data/notice is generated by the second module, data distribution function 34 will place the data/notice in the designated sink file 32. Then, when in response to a read data command generated by the designated data-consuming module 20, 22, 24, or 26, the read data function 34 returns an indication that a new data/notice was placed in the sink file 32 being queried, the data-consuming module will start to execute as may be appropriate. Thus, dynamic data distribution network 12 also eliminates the need to provide the individual modules with the specific function calls of the other modules that they need to execute.

Figure 8:
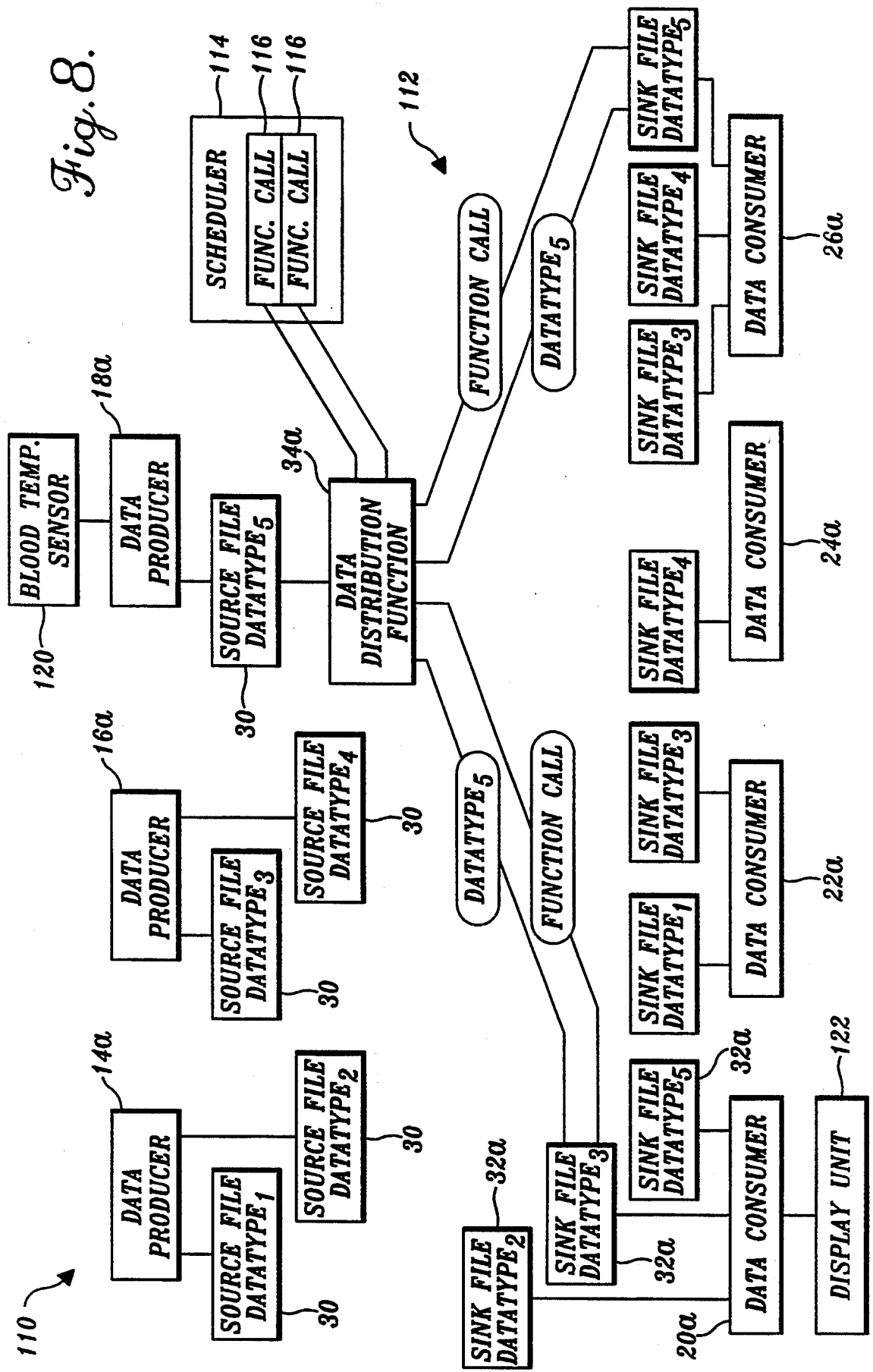
FIG. 8 is a block diagram of a portion of a multi-module software package that is contained in a cardiac monitor, wherein the package includes an alternative dynamic data distribution network of this invention.

FIG. 8 depicts a portion of a cardiac monitor 110 that includes an alternative dynamic data distribution network 112 of this invention. In FIG. 8, the modules 14a–26a that run on the digital data processing system integral with the cardiac monitor run in a single-tasking environment. Each module 14a–26a can be considered a set of instructions and data that are executed by the processor in response to a command generated by a function scheduler 114. While the scheduler 114 is shown as a separate module, it should be understood that in many versions of the invention the scheduler 114 may be part of the dynamic data distribution network 112 and may even be part of the data distribution function 34a. Each module 14a–26a has an associated function call 116, which, when processed by the scheduler 114, serves as a command that causes the processor to execute the module.

Figure 9:
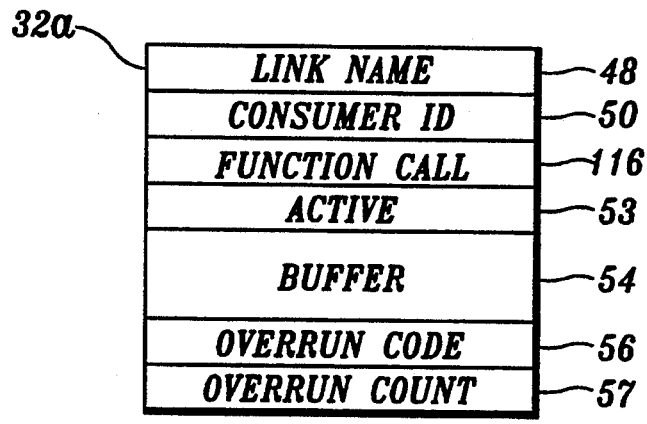
FIG. 9 is a detailed block diagram of a sink file that can be used with the dynamic data distribution network depicted in FIG. 8.

In this embodiment of the invention, the sink files 32a, as depicted by FIG. 9, are provided with a function call field 117. Each function call field 117 contains the function pointer for a particular data consumer 20a, 22a, 24a, or 26a. While many sink files 32a will contain function pointers for the modules 20a, 22a, 24a, or 26a that set up the files, it should be understood that other sink files may contain function pointers for modules different from those that established the files. After the data distribution function 34a copies new data into a sink file 32a, it copies the function pointer loaded in the sink file 32a to the scheduler 114. Based on the stored function calls 116, scheduler 114 then triggers the execution of the appropriate modules 20a, 22a, 24a, or 26a. As part of the execution of a module 20a, 22a, 24a, or 26a, the module generates a read data command to the read data function 60 (FIG. 6). In response to the receipt of this command, the read data function 60 copies the data from the designated sink file 32a into the location specified in the read data command as explained with respect to the first described embodiment of this invention.

For example, in the cardiac monitor 110, data producer 18a may be a module that monitors a sensing element 120 by which the patient's blood temperature is read. Data consumer 20a may be a display driver that controls the presentation of information, including blood temperature, on a display unit 122 integral with the cardiac monitor 110. Data consumer 26a may be a heart rate processor that, based on the blood temperature and other parameters, measures the performance of the patient's heart. When the cardiac monitor 110 is provided with the data distribution at network 112, data producer 18a periodically produces data representative of the patient's blood temperature. These data, represented as DataType5, are copied by the data distribution function 34a into the sink files 32a as blood temperature data used by data consumers 20a and 26a. As the data distribution function 34a copies the data into a particular sink file 32a, it copies the function call contained in the sink file function call field 117 into the scheduler 114. Consequently, in this situation, whenever the new blood temperature is available, data consumers 20a and 26a are triggered by the scheduler 114. As a consequence of their execution, data consumers 20a and 26a generate read data commands. In response to the generation of these commands, the read data function 60 copies the data from the associated sink files 32a in which the new blood temperature data are stored into the designated locations in the data consumers 20a and 26a. Data consumers 20a and 26a process the new data as appropriate. Data consumer 20a then causes the display unit 122 to indicate the new blood temperature and data consumer 26a recalculates the heart rate based on the new blood temperature.

This embodiment of the dynamic data distribution network 112 causes data-consuming modules that have new data available for processing to execute each time that new data are available. As a result, there is no need to provide the data-producing modules with instructions that cause the data-consuming modules to be executed along with the new data. Further, there is no need to provide the individual data consuming modules with queues to which notices of new data are sent or with mechanisms to periodically poll the queues. Still another advantage of this embodiment of the invention is that it provides a convenient mechanism by which one module can cause the execution of a second module. This is accomplished by having a first module, the module to be executed, establish a sink file 32a with an EVENT-type buffer 54. When a second module, the module that triggers execution, requires execution of the first module it will send an appropriate notice to the sink file 32a of the first module. Data distribution task 34a will then copy the stored function in the sink file 32a to the scheduler 114 to initiate the execution of the first module.

It will be understood that the foregoing description is for the purposes of illustration only. It will be readily understood that alternative constructions of the dynamic data distribution network of this invention can be created using process steps and file structures different from those disclosed above. For example, the source files and the sink files are described as monolithic structures, but such structures are not required to operate this distribution network. In alternative embodiments of the invention, the components forming these files may be stored apart from each other. For example, all the sink link tables may be stored in a single section in the memory of the digital data processing system. In such embodiments of the invention, the actual source files would contain pointers and other ancillary information that would be used by the data distribution function to access the appropriate link table and then the appropriate sink files. The overrun count fields in the sink files may similarly all be stored in a single section of memory. Furthermore, in some versions of the invention, the sink files may be integrally attached to the source files from which they receive their data. Moreover, it should also be recognized that in some versions of the invention an individual source file may receive data from more than one data-producing module. For example, a distribution network set up in whole or in part to handle errors may contain a source file that receives error notices from multiple data-producing modules. These notices, once received, may be forwarded to one or more sink files that are associated with data-consuming modules designed to respond to such information. In these versions of the invention, when a data-producing module accesses the source create function 36 to establish a source file for a particular type of data for which a source file is created, the source create function will first review the list 39 of established source files to determine if such a file has been established. Upon finding that the source file was established, instead of creating a duplicate source file, the source create function will return the pointer that identifies the file to the data-producing module that requested it be opened.

Also, while the data distribution function is described as being a single, monolithic function, it should be understood that, in alternative embodiments of the invention, the functions performed by this function may be performed by other, smaller functions. Also, in some embodiments of the invention, the process steps performed by the network may differ from those described. For example, the data distribution function may write the data directly into the sink files without initially storing the data in the source file, thereby eliminating the need to provide the source file with a data buffer. Therefore, it is the object of the appended claims to cover all such modifications and variations as come within the true spirit and scope of the invention.

The embodiments of the invention in which an exclusive property or privilege is claimed are defined as follows:

1. A method of distributing data in a digital data processing system having data producers that generate data, data consumers that use data, sink files associated with the data consumers, and with a specific type of data used by a specific one of the data consumers, and source files, each source file being associated with a specific type of data generated by a particular one of the data producers and including a list of sink files associated with data consumers that use the specific type of data, the method of distribution including the steps of:

selectively copying the data generated by a specific one of the data producers into specific sink files identified and listed in the specific source file associated with the specific type of data generated by the data producer; and transferring the data from the specific sink files to the data consumers associated with the source files.

2. The method of data distribution of claim 1, wherein each sink file includes a consumer identification used by the data consumer for the data with which the sink file is associated and said method further includes the step of:

transferring the consumer identification of the data from the sink file to the data consumer when the data are transferred from the sink file to the data consumer.

3. The method of data distribution of claim 2, further including the step of:

informing a data consumer that there are new data available in one of the sink files associated with the data consumer and of an identity of the sink file, when new data are copied into the sink file, and wherein:

said step of transferring the data from said sink file to the data consumer occurs after the data consumer is informed that new data are available in the sink file.

4. The method of data distribution of claim 2, wherein after said data are generated by the data producer, the data are copied into the source file associated with the data and the data are then copied from the source file to the sink files from which the data are transferred to the data consumers.

5. The method of data distribution of claim 1, further including the step of:

informing a data consumer that there are new data available in one of the sink files associated with the data consumer and of an identity of the sink file when new data are copied into the sink file, and wherein:

said step of transferring the data from said sink file to the data consumer occurs after the data consumer is informed that new data are available in the sink file.

6. A method of transferring data in a digital data processing system, which has data producers that generate data and data consumers that use the data, the method including the steps of:

establishing a plurality of sink files for storing the data used by the data consumers, each said sink file being associated with a specific type of data used by a specific one of the data consumers and including a consumer identification for the type of data used by an associated data consumer and a distinct sink file identifier;

establishing a plurality of source files, each of said plurality of source files being associated with a specific type of data generated by one of the data producers and having a specific source file identifier;

placing in each said source file at least one said sink file identifier that identifies a specific sink file associated with the type of data with which each source file is associated;

distributing data from a data producer by placing a copy of the data in a specific sink file associated with the data, based on said sink file identifiers in said source file associated with the data; and transferring the data placed into the specific sink file to the data consumer associated with said sink file.

7. The method of data transfer of claim 6, further including the step of: providing the data consumer with a notice that it has data available for processing when data are written into one of said sink files associated with the data consumer, wherein said notice identifies a specific sink file in which data are available; wherein:

said transferring of data from said specific sink file to the data consumer associated with said specific sink file occurs in response to the data consumer receiving said notice that data are available in said specific sink file.

8. The method of data transfer of claim 7, wherein said notice that data are available in said specific sink file associated with a data consumer is sent to a specific location in said data consumer based on a pointer contained in said sink file.

9. The method of data transfer of claim 7, wherein when said data are copied into said specific sink file, said data are written over any old data contained in said sink file.

10. The method of data transfer of claim 7, wherein when said data are copied into at least one said sink file, at least some of the old data in said sink file are saved.

11. The method of data transfer of claim 10, wherein:

said at least one sink file in which at least some of the old data are stored has a selected capacity for storing data, and when said capacity for storing data is reached as said data are copied into said sink file some of said data previously stored in said sink file are overwritten, and an overrun count indicative of the number of times the data in said sink file have been overwritten is incremented; and when the data from said sink file are transferred to the data consumer, said overrun count is also transferred to the data consumer and said overrun count is zeroed.

12. The method of data transfer of claim 7, furthering including the steps of:

establishing a selected source file for receiving a specific type of data generated by a plurality of the data producers; and distributing the specific type of data generated by the plurality of data producers by placing a copy of the data in a sink file associated with the data based on said sink file identifiers in said source file associated with the specific type of data.

13. A dynamic data distribution network for use with a digital data processing system that includes data producers, which generate data, and data consumers that use the data generated by the data producers, each data consumer having a consumer identification for a particular type of data used by the data consumer, comprising:

a plurality of sink files for storing data used by the data consumers, each of said plurality of sink files being associated with a specific type of data used by a different one of the data consumers and containing a buffer for storing the data used by the data consumer and, further, containing the consumer identification for the data used by the data consumer, each sink file having a particular sink file identification;

a plurality of source files, each of said plurality of source files being associated with a particular type of data generated by one of the data producers, and including a sink file table that contains said sink file identifications for said sink files associated with the data consumers that use the particular data generated by the one of the data producers, each source file having a particular source file identification;

distribution means for receiving distribute data commands, the distribute data commands including data to be distributed and including said source file identification for said source file associated with the data to be distributed, said distribution means, in response to receiving a distribute data command, storing the data to be distributed in said buffers of said sink files associated with the data consumers that use the data, based on reference to said sink file identifications in said sink file table contained in said source file associated with the data; and read means associated responsive to read data commands from the data consumers for reading the data to be distributed and the consumer identification associated with the data from said sink file associated with a data consumer that generates the read data command to the data consumer.

14. The dynamic data distribution network of claim 13, further including:

a plurality of queues for storing said sink file identifications, each of said plurality of queues being associated with a separate one of the data consumers; wherein:

said distribution means writes said sink file identification into said queue associated with the data consumer with which said sink file is associated when said distribution means writes data to be distributed into said sink file; and said read means in response to receiving a read data command from a data consumer reads said queues associated with the data consumer to obtain said sink file identifications and, if said queues contain a sink file identification, said read means reads the data to be distributed and the consumer identification for said data that are contained in said sink file identification.

15. The dynamic data distribution network of claim 14, wherein: each said queue associated with a data consumer has a distinct queue identification; each said sink file further includes said queue identification for the data consumer for which said sink file stores data; and said distribution means writes said sink file identification regarding the storage of new data to be distributed into one of said queues based on said queue identification contained in said sink file in which the next data to be distributed are stored.

16. The dynamic data distribution network of claim 14, wherein data buffers of select sink files are configured to contain a single version of the data to be distributed and, when said distribution means writes new data to said data buffers of said select sink files, said distribution means writes over any old data contained in said data buffers.

17. The dynamic data distribution network of claim 14, wherein:

said data buffers of select sink files contain multiple versions of the data, and said data buffers further include an overrun count field containing an overrun count that indicates how many times data in said buffers are overwritten;

said distribution means writes data to be distributed into said data buffers of said select sink files so that multiple versions of said data to be distributed are contained in said data buffers and, when said data buffers are full, said distribution means selectively overwrites the data to be distributed in said data buffers and increments said overrun count; and said read means reads said overrun count from each of said overrun count fields of said select sink files when reading the data to be distributed and zeroes said overrun counts after reading the data.

18. The dynamic data distribution network of claim 14, wherein said distribution means informs the data producer that it has distributed the data to be distributed after said data has been stored in said sink files associated with the data consumers that use said data.

19. The dynamic data distribution network of claim 14, wherein: at least one said source file is associated with a particular type of data generated by a plurality of data producers.

20. The dynamic data distribution network of claim 13, wherein:

each said source file includes a buffer for storing the data with which said source file is associated; and said distribution means, upon receiving the distribute data command, writes the data into said buffer of said source file associated with the data to be distributed and copies said data from said buffer of said source file to said buffers of said sink files associated with the data consumers that use said data.

21. The dynamic data distribution network of claim 13, wherein said distribution means informs the data producer that it has distributed the data to be distributed after said data has been stored in said sink files associated with the data consumers that use said data.

* * * * *